April 28, 1959
A. M. WARN
2,884,101
WHEEL-HUB CLUTCH
Filed Oct. 8, 1956
3 Sheets-Sheet 1
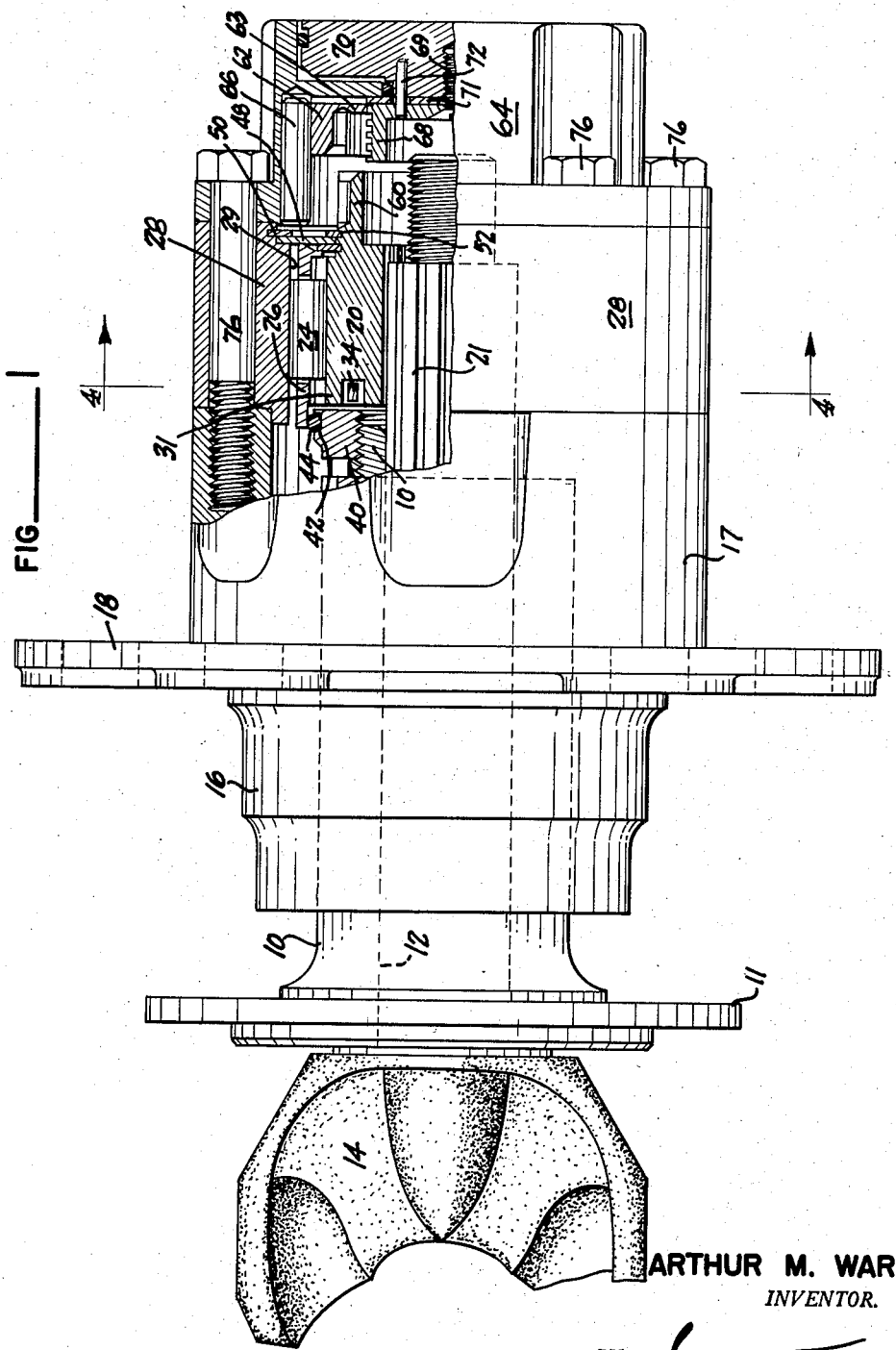
ARTHUR M. WARN
*INVENTOR.*
BY April 28, 1959  A. M. WARN  2,884,101
WHEEL-HUB CLUTCH
Filed Oct. 8, 1956  3 Sheets-Sheet 2
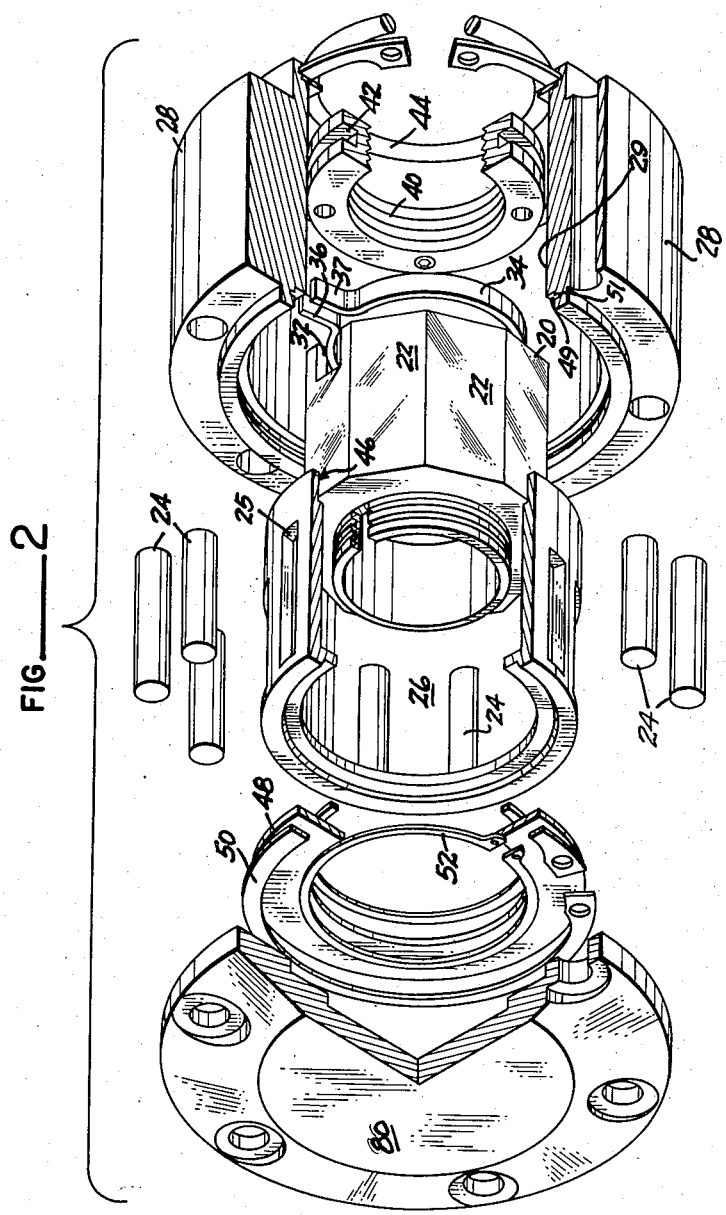
FIG__2
ARTHUR M. WARN
*INVENTOR.*
BY *Smith & Tuck*

April 28, 1959
A. M. WARN
2,884,101
WHEEL-HUB CLUTCH
Filed Oct. 8, 1956
3 Sheets-Sheet 3
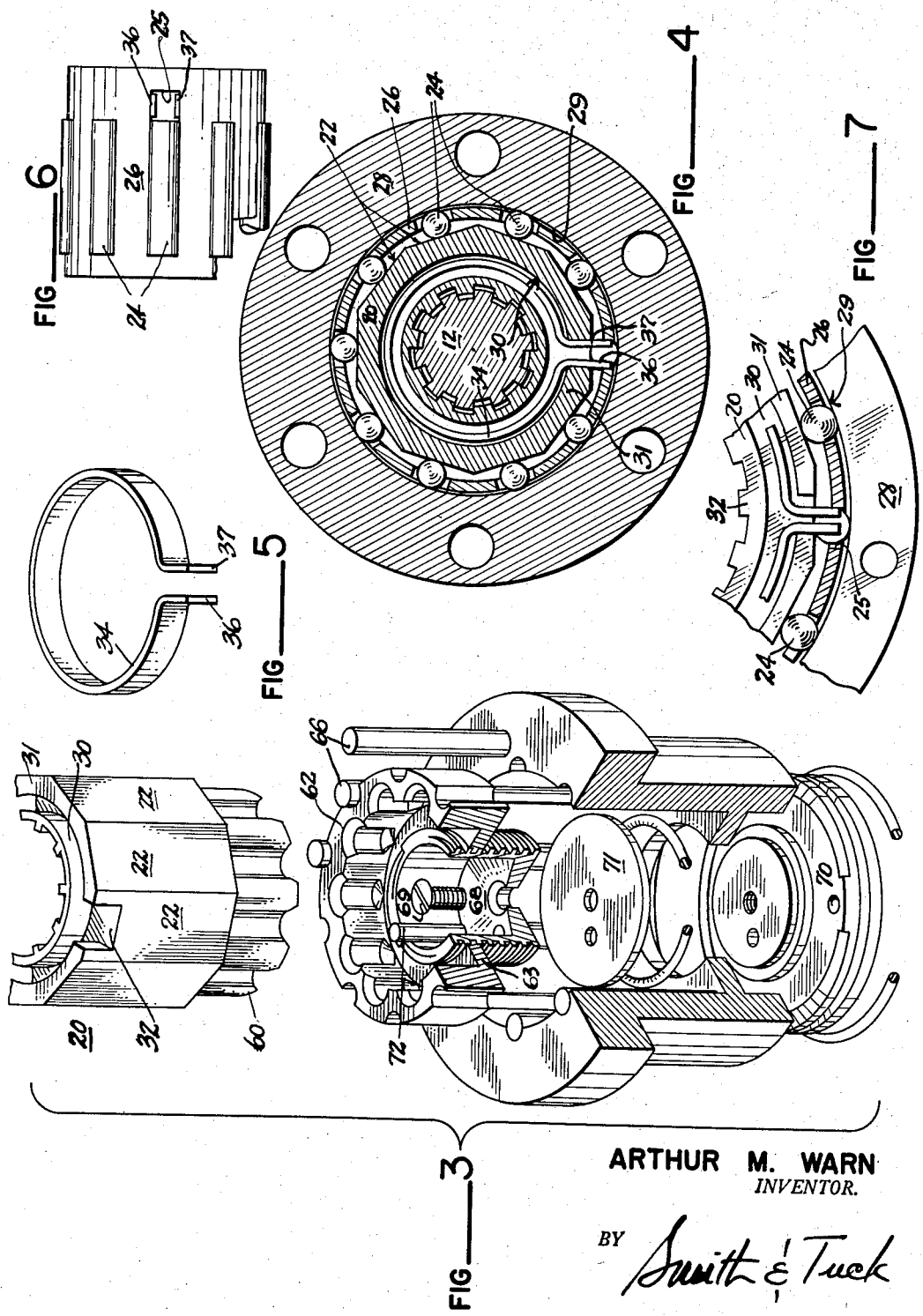
ARTHUR M. WARN
INVENTOR.
BY *Smith & Tuck*

United States Patent Office 2,884,101
Patented Apr. 28, 1959

2,884,101

WHEEL-HUB CLUTCH

Arthur M. Warn, Seattle, Wash.

Application October 8, 1956, Serial No. 614,529

3 Claims. (Cl. 192—44)

This invention relates to a wheel-hub clutch and, more particularly, to a clutch mechanism to connect a front wheel to a journalled front axle of a four-wheel drive vehicle.

Normally such front wheels, when positively connected to the drive axle, during non-drive periods produce rotation in the drive train back to the front end transmission case.

It is desirable during the operation of four-wheel drive vehicles of the well-known types, typified by the Willys' "Jeep" for example, that the front wheels be free-rolling when they are not being driven. In other words, the front wheels should be disconnected from the front axles during such non-drive periods in order to reduce drag on the engine, to preclude rotation of the drive shafts, gears, etc., and to avoid unnecessary wear and tear.

It is among the more important objects of this invention to provide a clutch mechanism which operates automatically upon application of torque to the associated axle, which operates in both directions of drive, and which automatically disengages and becomes inoperative upon the termination of the application of power to the axle. Other objects include the provision of a simple mechanism which may be manufactured at relatively low cost, is easy and simple to install, and requires little or no maintenance during long periods of use. Still another object is to provide a clutch mechanism with which may be associated a manually operable locking mechanism whereby the wheel and axle may be positively locked in drive relation as desired by the vehicle operator.

These and other objects are accomplished by the apparatus more fully shown in the accompanying drawings and described in the annexed specification. It will of course be obvious to those skilled in this art that changes and alterations may be made in the proportions and arrangement of parts. Those equivalent assemblies which fairly fall within the spirit and scope of the subjoined claims are intended to be covered by this patent.

In the accompanying drawings, in which is shown a preferred form of my invention and a modification thereof:

Figure 1 is an elevation view of my clutch mechanism for wheel hubs, with portions broken away and others shown in sections for convenience of illustration;

Figure 2 is an exploded perspective view of the essential elements of my clutch mechanism;

Figure 3 is an exploded view of the device of Figure 1;

Figure 4 is a cross-sectional view taken on line 4—4 of Figure 1;

Figure 5 is a perspective view of an annular spring used in my clutch mechanism;

Figure 6 is an elevational view of a roller cage and roller forming part of my clutch mechanism; and Figure 7 is an enlarged fragmentary sectional view showing the mechanism in clutching relation.

With reference to Figure 1, sleeve journal 10 receives drive shaft 12 which includes knuckle member 14 of a universal joint. Sleeve 10 by means of its flange 11 is secured to the front wheel supporting apparatus in the usual manner. Wheel bushing 16 and its flange 18 receive the center flange of a conventional automobile wheel (not shown). Bushing 16 freely rotates on sleeve 10 as the wheel rolls over the ground. Hub 17 extends outward of flange 18.

The exteriorly polygonal sleeve 20 is fitted to the splines 21 of shaft 12 and rotates therewith when the same is driven. The exterior flat camming surfaces 22 of sleeve 20 each receive a roller 24 which fits into a suitable opening in the cylindrical roller cage 26 as shown in Figures 2 and 6. Clutch housing 28 projects from hub 17 and encloses sleeve 20 and rollers 24 so that its inner annular surface 29 is spaced from the medians of the flat surfaces 22 a distance slightly more than the diameter of rollers 24. It will be apparent that any shift of a roller 24, from its medial position relative a flat surface, results in the roller being wedged against housing surface 29 to produce a clutching action.

The inner end of sleeve 20 is provided with an annular groove 30. A notch is formed in the exterior wall 31. A circular expansion spring 34 as shown in Figure 5 has its body inserted into groove 30. Spring horns 36, 37 pass radially outward through notch 32 in wall 31 and extend into the elongated opening 25 of roller cage 26 to form a flexible connection between the sleeve 20 and cage 26. By this arrangement it is possible, when torque is released from drive shaft 12 and sleeve 20 splined thereto, to transmit a slight degree of rotation to cage 26. The rollers 24 are thus shifted into the non-clutching or center positions between surfaces 22 and housing inner surface 29 due to the equalizing action of horns 36 and 37.

A nut 40 threadedly engaged on journal sleeve 10 has an exterial annular groove 42 which carries the O-ring 44 formed of rubber-like material such as "neoprene" or its equivalent. The O-ring 44 bears on the inner end surface 46 of cage 26 and functions as a friction brake on the cage. When torque is applied to shaft 12 and sleeve 20 it is preferable that the rollers 24 and cage 26 be momentarily restrained to permit them to be lifted or moved outward the slight degree necessary to produce clutching. The O-ring 44 accomplishes this through the unusual effect created by the use of neoprene. It appears that, despite the presence of considerable lubricant in such a clutch mechanism, these O-rings tend to freeze or seize to adjacent smooth surfaces, and relative movement between the ring and such surface requires force to overcome the static condition. Considering the arrangement described and bearing in mind the peculiar seizing characteristic, it will be seen that O-ring 44 holds cage 26 against rotation free of journal sleeve 10 until the clutching rollers lock in place against housing 28. Thereafter cage 26 freely revolves around the O-ring until torque is no longer applied to drive shaft 12. At that time the frictional effect of the O-ring reasserts itself and cage 26 is braked. Spring 34 also comes into play and operates to bring the cage in the centered position described. The rollers then no longer clutch the housing.

It will be noted that shaft 12 may be operated in either direction. Thus the flats 22 are also universal in their operation on rollers 24. Likewise spring 34 is multi-directional in its effect on the cage through the operation of horns 36, 37 as shown in Figure 7.

A retainer ring 48 fits in recess 49 of housing 28 and is there retained by spring ring 50 fitted into groove 51. Ring 48 bears on and retains race 26 in place. By means of ring 48 and spring ring 52 at the central opening and around sleeve 20, the latter is secured in place as shown in Figure 1.

In the showings of Figures 1 and 3 the device includes a locking mechanism operable to positively secure the driven axle 12 to wheel flange 18. For convenience of illustration this locking apparatus is omitted in Figure 2. The features of this locking mechanism are more fully shown and described in my U.S. Patent No. 2,684,140, issued July 20, 1954. It is sufficient for the purposes of this description to understand that sleeve 20 has an extended spline-end 60 with which may be mated the interiorly toothed cup 62 that is axially slidable within hub cap 64 on guide rods 66 that form the guide ways. Cap 64 supports for rotation the screw cup 68 which is threadedly mated with the hub 63 of cup 62. Cup 68 is secured by screw 69 to a manually rotatable disc 70 mounted in the outer end of hub cap 64. Pin 72 off-center of cup 68 passes through the retainer washer 71 into hole 73 and insures rotation of the screw cup upon rotation of disc 70. Suitable retaining O-rings may be used to prevent leakage of contained lubricants.

The cap 64, housing 28 and hub 17 are all secured together by a series of bolts 76 shown in Figure 1.

It is to be understood that when the positive locking apparatus is disengaged, a fully automatic clutch mechanism is provided for the secondary drive wheels of a four-wheel drive vehicle. When the other drive wheels are sufficient to move the vehicle, the operator will normally desire to have his secondary, usually the front, wheels disengaged and free rolling. However, upon the application of power, through the front end or secondary transmission, the shaft 12 will be revolved. This, in the manner described, automatically results in the housing 28 and the wheel being clutched and secured in driving relation to the axle. This effect is available either in forward or reverse direction.

In the instance shown in Figure 2 where the locking means is dispensed with, a cover plate 80 serves to seal the mechanism in lieu of hub cap 64 otherwise used.

Having thus described my invention, I claim:

1. A clutch mechanism for four-wheel-drive vehicles to connect a front wheel and a journalled front axle upon the application of torque to said axle, comprising: an exteriorly polygonal sleeve fitted to the axle end, a clutch housing having an annular race enclosing the plane surfaces of said sleeve in spaced apart relation thereto and attachable to a front wheel on said axle journal, a cylindrical roller disposed between each plane surface of said polygonal sleeve and said race, a roller cage between said polygonal sleeve and said annular race and ported to receive said rollers, said cage having an annular surface enclosing a portion of the axle journal, a flexible connector between said sleeve and said cage and biased to center the rollers relative their associated plane surfaces during periods when no torque is applied to said axle, and a rubber O-ring friction brake between the axle journal and the annular surface of said cage operable to momentarily retard rotation of said cage and its associated rollers upon the rotation of said sleeve.

2. A clutch mechanism for four-wheel-drive vehicles to connect a front wheel and a journalled front axle upon the application of torque to said axle, comprising: an exteriorly polygonal sleeve fitted to the axle and having an annular recess in one end and a notch in the outer wall of said recess, a clutch housing having an annular race enclosing the plane surfaces of said sleeve in spaced apart relation thereto and attachable to a front wheel on said axle journal, a cylindrical roller disposed between each plane surface of said polygonal sleeve and said race, a roller cage between said sleeve and said annular race and ported to receive said rollers, said cage having an annular surface enclosing a portion of the axle journal, a circular spring in said sleeve annular recess and having outstanding end horns disposed in said sleeve notch and passing into said cage, said spring being biased to center the rollers relative to their associated plane surfaces during periods when no torque is applied to said axle, and a rubber O-ring friction brake between the axle journal and the annular surface of said cage operable to momentarily retard rotation of said cage and its associated rollers upon the rotation of said sleeve.

3. A clutch mechanism for four-wheel-drive vehicles to connect a front wheel and a journalled front axle upon the application of torque to said axle, comprising: a sleeve having exterior camming surfaces and fitted to the axle end, a clutch housing having an annular race enclosing said sleeve and attachable to a front wheel on said axle journal, a roller cage and a plurality of rollers disposed between said sleeve and race, a flexible connector between said sleeve and said cage and biased to maintain said rollers to non-clutching position on said camming surfaces during periods when no torque is applied to said axle, and a rubber O-ring friction brake carried by the axle journal and bearing directly on the cage to momentarily retard rotation of the same upon the application of torque to the axle.

References Cited in the file of this patent

UNITED STATES PATENTS

| 836,035 | Hendricks | Nov. 13, 1906 |
| 1,735,125 | Miller | Nov. 12, 1929 |
| 2,393,693 | Kelbel | June 29, 1946 |